US008572580B2

(12) United States Patent
Sheehan et al.

(10) Patent No.: US 8,572,580 B2
(45) Date of Patent: Oct. 29, 2013

(54) COMPUTER APPLICATION PACKAGES WITH CUSTOMIZATIONS

(75) Inventors: John M Sheehan, Somerville, MA (US); Kristofer H Reierson, Acton, MA (US)

(73) Assignee: Microsoft Corporation, Redmond, WA (US)

(*) Notice: Subject to any disclaimer, the term of this patent is extended or adjusted under 35 U.S.C. 154(b) by 954 days.

(21) Appl. No.: 12/181,303

(22) Filed: Jul. 28, 2008

(65) Prior Publication Data

US 2010/0023934 A1 Jan. 28, 2010

(51) Int. Cl.
G06F 9/44 (2006.01)

(52) U.S. Cl.
USPC .................... 717/131; 717/121; 717/124

(58) Field of Classification Search
USPC ............ 717/120–135, 168–178; 709/200, 709/232–236
See application file for complete search history.

(56) References Cited

U.S. PATENT DOCUMENTS

| | | | |
|---|---|---|---|
| 5,920,725 A | 7/1999 | Ma et al. | |
| 5,950,001 A | 9/1999 | Hamilton et al. | |
| 6,115,719 A | 9/2000 | Purdy et al. | |
| 6,675,382 B1 | 1/2004 | Foster | |
| 6,859,834 B1 | 2/2005 | Arora et al. | |
| 7,076,778 B2* | 7/2006 | Brodersen et al. | 717/170 |
| 7,318,216 B2* | 1/2008 | Diab | 717/108 |
| 7,376,945 B1* | 5/2008 | Kakumani et al. | 717/171 |
| 7,458,073 B1* | 11/2008 | Darling et al. | 717/168 |
| 7,516,440 B2* | 4/2009 | Upton | 717/106 |
| 7,882,501 B1* | 2/2011 | Carlson et al. | 717/167 |
| 2005/0066304 A1 | 3/2005 | Tattrie et al. | |
| 2005/0149925 A1 | 7/2005 | Pichetti et al. | |
| 2007/0168960 A1 | 7/2007 | Carey et al. | |
| 2007/0169045 A1* | 7/2007 | Nallipogu et al. | 717/151 |
| 2007/0180433 A1 | 8/2007 | Ghobrial et al. | |
| 2007/0226728 A1* | 9/2007 | Thorson et al. | 717/168 |
| 2007/0240155 A1 | 10/2007 | Shlomai | |
| 2007/0294684 A1* | 12/2007 | Kumashiro et al. | 717/168 |
| 2008/0201701 A1* | 8/2008 | Hofhansl et al. | 717/168 |

OTHER PUBLICATIONS

Venners, B., The lean, mean, virtual machine, Javaworld, http://www.javaworld.com/javaworld/jw-06-1996/jw-06-vm.html [last accessed Apr. 23, 2012], Jun. 1, 1996, 7 pgs.*
David Sprott, Enterprise resource planning: componentizing the enterprise application packages, ACM, vol. 43 Issue 4, Apr. 2000, pp. 63-69.*
Ben Light, Going beyond 'misfit' as a reason for ERP package customisation, Elsevier, vol. 56, Issue 6, Aug. 2005, pp. 606-619.*

(Continued)

*Primary Examiner* — Wei Zhen
*Assistant Examiner* — Satish Rampuria
(74) *Attorney, Agent, or Firm* — Michael B Dodd; Dodd Law Group

(57) ABSTRACT

Applications operated within a virtual environment may be organized into a package containing various software components. Each software component or resource may have a specific name and other metadata, including a designator for overwriting or modifying the component. A policy may define how any changes to specific software components may be stored and retrieved based on the designator. One or more sets of changed components may be generated, persisted, and re-applied to create a customized version of the application based on the original package. The application may be operated within a virtual application environment or within a dedicated virtual machine environment.

20 Claims, 4 Drawing Sheets

(56) References Cited

OTHER PUBLICATIONS

Rebecca Henderson Chatfield, Sarah Kuhn, Michael Muller, The Customization Process for Organizational Package Information Systems: A Challenge for Participatory Design, PDC'98 Proceedings of the Participatory Design Conference, Seattle, Washington, USA, Nov. 12-14, 1998, pp. 45-54.*

Zhou,, et al., "A Rule-Based Component Customization Technique for QoS Properties", Proceedings of the Eighth IEEE International Symposium on High Assurance Systems Engineering (HASE'04), 2004, IEEE, pp. 2.

Yau, et al., "A Framework for Extensible Component Customization for Component-Based Software Development", Proceedings of the Sixth International Conference on Quality Software (QSIC'06), 2006, IEEE, pp. 8.

Yau, et al., "An Approach to Object-Oriented Component Customization for Real-time Software Development", Fifth IEEE International Symposium on Object-Oriented Real-Time Distributed Computing, 2002, pp. 8.

Meur, et al., "An Environment for Building Customizable Software Components", Lecture Notes in Computer Science; vol. 2370, Proceedings of the IFIP/ACM Working Conference on Component Deployment, Springer-Verlag, 2002, pp. 14.

International Search Report and Written Opinion for PCT/US2009/050891 dated Feb. 2, 2010.

"Chinese Second Office Action", Application No. 200980130471.1, Filed Date : Jul. 16, 2009, Mailed Date : Dec. 20, 2012, pp. 9.

* cited by examiner

COMPUTER APPLICATION PACKAGES WITH CUSTOMIZATIONS

BACKGROUND

Applications may be any type of computer software that performs a function or service. In many cases, an application may be a software system that enables a user to perform a task, such as word processing, prepare and display presentations, or track and analyze finances. Such software systems may have several different types of files and other resources, including executables, scripts, dynamic linked libraries, metadata, registry settings, and other resources that work together to provide the application's service or function.

Many applications have elements that may be customized. For example, a user interface may be configured with a specific look and feel, and certain functions may be enabled, disabled, or configured to act in a specific manner.

SUMMARY

Applications operated within a virtual environment may be organized into a package containing various software components. Each software component may have a specific name and other metadata, including a designator for overwriting or modifying the resource. A policy may define how any changes to specific software components may be stored and retrieved based on the designator. One or more sets of changed components may be generated, persisted, and re-applied to create a customized version of the application based on the original package. The application may be operated within a virtual application environment or within a dedicated virtual machine environment.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
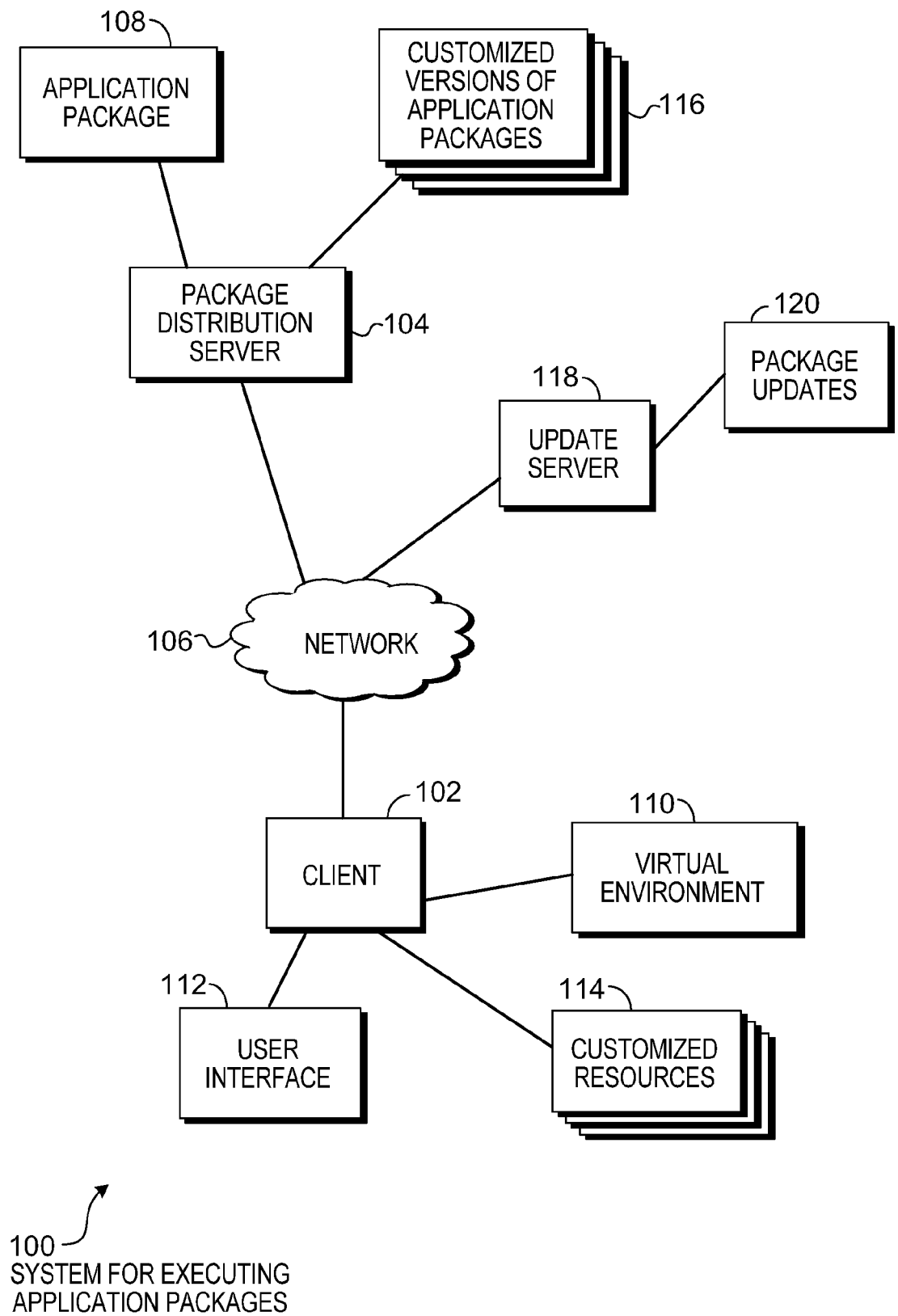
FIG. 1 is a diagram illustration of an embodiment showing a system for executing application packages.

An application may be created as a package that is executed in a virtual environment. The package may contain all the various files or other resources that may make up an application. Each file or resource within the package may have a set of metadata that may be used for tracking changes to the package. The changes may be incorporated into a modification package that may contain modified versions of the changed files.

Modified files may be used in conjunction with the original application package to create a modified version of the application package. In some embodiments, a customized application package may be created where the modified files are included in place of the original files of the application package.

Each file within the package may have an overwrite bit or some other metadata that may enable a change to be made, persisted, and used at a later time. Other files within a package may not have such metadata and may not be changed. Some files may be allowed to change but the change may not be persisted.

A set of policies may be used to determine how a specific type of change or a change to a particular file may be persisted. In some cases, a policy may enable a change to be applied to other users of a system as a system specific change. A policy may be applied to a user such that the user experiences a customization regardless of the machine being used. Other applications of policies may enable changes to be propagated to groups of systems or users, changes to be applied in specific circumstances, or other definitions.

As application packages are updated, different versions of the packages may be created. When the application is executed in a virtual environment, the latest version of the package may be retrieved and executed. An update manager may integrate the set of changed files with the updated application package based on metadata associated with the individual files. For example, some updated files in an application package may be set to overwrite a file that was customized or modified by a user, while other updated files may not be.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, resources, data structures, etc. that perform particular tasks or implement particular abstract data types. Typically, the functionality of the program modules may be combined or distributed as desired in various embodiments.

FIG. 1 is a diagram of an embodiment 100 showing a system with for executing application packages. Embodiment 100 is an example of a system that may manage application packages as the applications are customized by users as well as upgraded by application developers. Applications may be configured as packages and executed within a virtual environment. As changes are made to resources associated with the application, those changes may be saved or discarded based on metadata associated with the resources and a set of policies defining how changes are handled.

The diagram of FIG. 1 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 100 is a functional diagram that illustrates several components and a general architecture for a system for managing packaged applications. The architecture may consist of a package distribution server 104 that may connect to a client 102 through a network 106. In many embodiments, the package distribution server 104 may be a computer server and the client 102 may be a personal computer connected over a local area network. In other embodiments, the server 104 and the client 102 may be connected across a network 106 comprising the Internet or other wide area network.

The architecture illustrated in embodiment 100 is a typical type of client-server architecture that may be found in a business or other enterprise. Other embodiments may use a different type of architecture where some of the functionality described for the server 104 may be performed by the client 102 and vice versa.

The client 102 may be any type of computing platform, including a personal computer, a handheld mobile device, a cellular telephone, a handheld scanner, a laptop or other portable computer, a network appliance, network enabled measuring instrument, or any other device that may have a user interface 112.

Embodiment 100 illustrates a system by which a package distribution server 104 may serve an application package 108 to the client 102, so that the application package 108 may be executed within a virtual environment 110. In many embodiments, the package may be executed in a virtual environment 110 for the benefit of the client 102.

For example, a word processor application may be configured as an application package 108 and transmitted to the client 102 where the client 102 may cause the word processor application to execute. A user interface 112 may show the actions of the word processor and be a mechanism for a user to use the application.

In some embodiments, the application package 108 may be for a service or other application that may interface with another computer. Such applications may or may not use the user interface 112.

The client 102 may cause the application package 108 to be executed within a virtual environment 110. The virtual environment 110 may be a virtual machine environment or a virtual application environment. A virtual machine environment may be a software construct that simulates an operating system environment in which the application package may be executed.

A virtual application environment is a mechanism whereby an application may be executed without interfering with other applications. Application virtualization may create application-specific copies of shared resources. Each application may have a separate configuration of potentially shared resources such as registry entries, dynamic linked libraries, and other objects that may be packaged with the application. The package may be executed in a cache, creating a virtual application. When a virtual application is deployed, it uses its own copy of these shared resources.

Because an application may be executed within a virtual environment, the application may be changed, modified, and updated without interfering with other applications that may use shared resources. A virtual environment may enable separation between other applications and allow each application to be separately configured.

An application package 108 may contain all the files and resources used to execute the application. Such resources or components may include executable files, scripts, configuration files, dynamic linked libraries, data files, templates, registry settings, metadata, and any other file type, data, or other element.

Each application package 108 may include metadata for each resource that may describe, among other things, whether the resource may be updated and how those updates are to be handled. For example, the metadata may define whether a user may change the resource and whether that change may persist. In another example, the metadata may also define how the resource may be updated when a new version of an application is available. In yet another example, the metadata may define the mechanism by which changes are persisted and how the changes may be propagated to other users or other devices. The metadata may contain information used during an initial build of a new version of an application package and different information that may be used after the package is complete and is being executed.

When a resource within an application package 108 is updated, modified, or configured, the change may be persisted and used again when the application package is restarted in a similar context. A change may be persisted and reused via several different mechanisms.

An application package 108 may contain files as well as other resources for which changes may be tracked and stored. Throughout this specification, the term resources is used to exemplify those resources, which may include executable files, data files, configuration files, registry entries, COM resources, IP address, metadata, configuration elements, settings, and other resources. Any mention of resources may include any type of resource, including those described above.

In a first mechanism, changes may be stored in a separate set of customized resources 114. When the application package 108 is launched, the set of customized resources 114 may be incorporated into the application package 108 at runtime by replacing the corresponding resources in the application package 108 with the customized resources 114.

Such an embodiment has several distinct characteristics. The application package 108 may be a pristine package containing all of the unchanged versions of resources within the application. Any changes made to the configuration of the application may be stored separately in the group of customized resources 114. Such an embodiment has a more complicated startup routine, as the customized resources 114 may be incorporated into the application package 108.

In a second mechanism, changes may be used to create customized versions of application packages 116. Several different customized versions of application packages 116 may be created, each for a different user or different situation. The customized versions of application packages 116 may be complete application packages that include all of the various resources that make up an application.

Such an embodiment has several distinct characteristics. The application packages 116 may each be quite large and, when many different configurations are present, the amount of storage used by the application packages 116 may be large. However, the application packages 116 may be complete, standalone applications containing all of the resources used for execution. As complete application packages, they may be more quickly launched and execution begun than using the first mechanism.

Other embodiments may have different mechanisms for managing, storing, and retrieving customized or modified resources. In some embodiments, metadata or policies may be used to determine that some types of changes to a package may be stored in customized resources 114 and other changes used to create customized versions of application packages 116. Some changes may be local in nature and may affect only the users of a specific client 102. Other changes may be more broadly deployed and may be shared with other client devices through a customized version of an application package 116 by the package distribution server 104.

From time to time, an update server 118 may distribute update packages 120 to the package distribution server 104. The update packages 120 may include bug fixes, upgrades, new features, or other changes to an application package 108. The package distribution server 104 may have an update manager that may create a new application package 108 using the package updates 120.

The package updates 120 may be in the form of complete packages or in the form of a group of modified or updated resources, such as a differential set of resources. In either case, a decision may be made as to how to incorporate customized resources 114 into the updated package. In some cases, a resource from an update server 118 may have metadata that forces the resource to overwrite any existing resources, be they original resources in a previous version of an application package 108 or customized resources 114 that may be created or modified by users.

Metadata in a package update 120 may define whether an updated resource is to be used in place of any existing resources. Such metadata may indicate that the updated resource is to be used in place of any previous version or may indicate that the updated resource may be used in place of an earlier version but not a user customized version. The metadata may separately define if modifications to the resource may be made by a user and how those modifications may be persisted.

Figure 2:
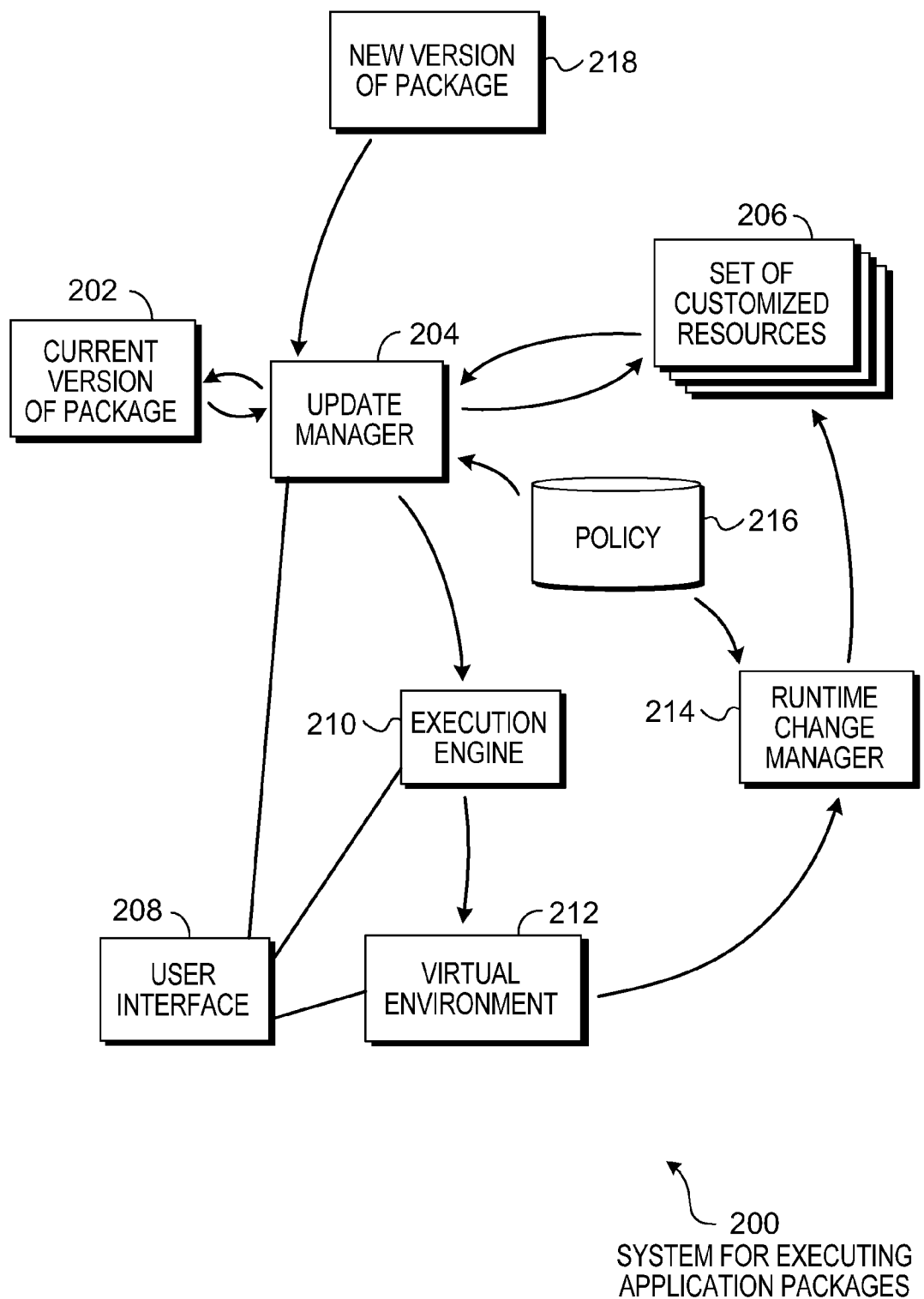
FIG. 2 is a diagram illustration of an embodiment showing functional elements of a system for executing application packages.

FIG. 2 is a diagram of an embodiment 200 showing a system with for executing application packages. Embodiment 200 is an example of the functional components of a system that may manage application packages as the applications are customized by users as well as upgraded by application developers.

The diagram of FIG. 2 illustrates functional components of a system. In some cases, the component may be a hardware component, a software component, or a combination of hardware and software. Some of the components may be application level software, while other components may be operating system level components. In some cases, the connection of one component to another may be a close connection where two or more components are operating on a single hardware platform. In other cases, the connections may be made over network connections spanning long distances. Each embodiment may use different hardware, software, and interconnection architectures to achieve the functions described.

Embodiment 200 is an example of the functional elements that may be used to manage updates to executable application packages. The functional elements may be various functions that may be performed on one or more devices and in many different configurations. In some cases, various functions may be performed by different physical devices connected through a local area network or a wide area network such as the Internet. In other cases, two or more, or perhaps all of the various functions may be performed on a single device.

The functions described in embodiment 200 illustrate one mechanism by which an application package may be managed through various update cycles. In some cases, updated versions of a package may be created by an application developer or software manufacturer. The updated versions may be used to create a current version of an application package. In other cases, a modification or customization may be made by a user, system administrator, or other entity and those customizations may be persisted and incorporated into the application package.

The modified or customized resources may be tracked and handled separately from updates created by a software manufacturer. Metadata within the application packages may define how an update is to be handled. The metadata may enable or disable updates and may allow some updates to be persisted, some to overwrite other updates, and many other options.

A set of policies may be used to define how customized resources may be persisted and applied. A policy may define some updates or customizations to be persisted and applied to all users of a device, to various groups of users, or for individual users. A policy may categorize specific types of updates and apply those updates in different manners.

An update manager 204 may provide an execution engine 210 with an application package to execute. The application package may include resources from a current version of a package 202 along with some customized sets of resources 206. The update manager 204 may create a customized application package by merging a current version of a package 202 and groups of sets of customized resources 206.

In some cases, an update manager may apply two or more customized sets of resources 206 based on a policy 216. Sets of customized resources 206 may be created based on the policy 216 for various types of changes. Some changes may be applied to an entire company or enterprise, while other changes may be applied to departments within the enterprise, groups within a department, or specific users or devices. Some changes may be applied to different types of devices, regardless of the users, while other changes may be applied to different types of users, regardless of the devices being used.

In some cases, specific sets of customized resources may be created for certain circumstances. For example, an application used by security guards for monitoring a building may have customizations defined for nighttime surveillance of a building, and separate set of customizations defined for daytime building operations. In another example, an accounting application may have a specific set of features or customizations defined for year-end accounting and a separate set of customizations defined for forensic accounting.

In cases where two or more sets of customized resources are used, the customized resources may be applied in a particular order, with the last set applied having precedence. For example, a company-wide set of customizations may be applied first, then a department-wide set of customizations, and lastly a user-specific set of customizations. Other embodiments may have different techniques or mechanisms for incorporating multiple sets of customizations.

The sets of customized resources 206 may include a set of configuration resources, data files, or other types of resources that may modify any portion of an application. In some cases, the customized resources may include items that change the look and feel or user interface of an application. For example, a company-wide set of customized resources may include a company logo and the phone number or email address for the company's internal help desk. A user created set of customized resources may include settings for font size and color scheme. In another example, a set of configuration resources may include network settings and addresses that may enable an application to connect to a remote service hosted on a server located in a local area network or available through the Internet. Different configuration resources may be used depending on the physical location or network location of a device at the time an application is launched.

In other cases, the customized resources may include items that change the function or performance of the application. For example, a set of customized resources 206 may include scripts, macros, or executable files that perform specific tasks, application plug-in modules, configuration resources that enable or disable specific functions, or other functional changes to the application. In another example, a set of customized resources 206 may include network addresses and connection parameters to enable an application to connect to a specific service provided at a specific network address, while a different set of customized resources 206 may be used to connect to a similar service on a different server.

In still other cases, the customized resources may include data that may be used by the application. For example, a word processing program may have a set of customized resources that include a company letterhead or personalized stationery. Some such customized resources may include templates, formats, or default sets of data that are used in various functions or operations.

The sets of customized resources 206 may be created by different types of users or may be classified in different manners. The type of customization and the ability for a specific type of user to modify a particular resource may be defined in the metadata associated with the resource as well as the policy 216. For example, some types of enterprise-wide customizations may be implemented by a user with administrative privileges. For example, an application package may have specific features that may be enabled or disabled based on licensing restrictions or general company policy. Such changes may be permitted by an administrator but not by a general user.

Some users may be defined as group administrators and may be able to add or modify customizations that are used by a group of users such as a department within a company, but not be able to initiate changes that are used in other departments or groups.

Some embodiments may permit a user to create a customized resource or change an existing resource then define how that change may be propagated. For example, a user may make a change to an existing resource within an application package. The user may be presented with a set of options for how the change may be applied across other instances of the application. The user may, for example, enable the change to be used by other individuals or groups of users. By selecting how the change may be applied, the change may be saved in different sets of customized resources 206.

The policy 216 may permit changes to be persisted using different mechanisms. For example, some changes may be persisted on a local storage device and used when the application is executed on the local device. Other changes may be persisted on a network server and shared across other users and other devices.

Some policies may enable sets of customized resources 206 to be applied on a user basis as well as a device basis or a functional basis. A user basis may refer to applying a set of customized resources based on the user identity, such as a specific user or group of users. A group of users may be defined by a type of user, such as an administrator, power user, general user, or guest user. Other groups of users may be defined by function, such as Program Managers or Administrative Assistants. Still other groups of users may be defined by an affiliation, such as Marketing Department members or Bicycle Club members.

A device basis for applying a set of customized resources may be based on a specific device identity or groups of devices. Some groups of devices may be identified by various functional characteristics, such as whether the devices have a specific capability or peripheral device attached, for example. Some groups of devices may be identified using network addresses, such as devices within a specific subnet. Groups of devices may also include devices associated with a company department, such as Accounting Department. Some devices may be classified by type, such as laptop computers, desktop computers, server computers, handheld scanners, mobile telephones, or other types of devices.

A functional basis for applying a set of customized resources may be based on a specific function that may be performed with the application. For example, an inventory management application may have a set of customized resources that are selected when shipping and receiving functions are to be performed. A different set of customized resources may be selected when a physical inventory function is to be performed.

In some embodiments, a policy 216 may permit a complex set of criteria for selecting and applying sets of customized resources 206 to a current version of an application package 202. For example, a user performing a specific function on a specific device may use sets of customizations that include company-wide customizations, department-specific customizations, function-specific customizations, device-specific customizations, and user-specific customizations. Each set of customizations may add or remove various elements from an application package so that the application package may appear radically customized but may stem from a single current version of an application package 202 that is used across many users, devices, and functions.

Some of the customized resources within the sets of customized resources 206 may be modifications of existing resources or may be separate resources unrelated to other resources. A modification of an existing resource may be an updated version of a standard resource within an application package.

For example, a configuration resource may be defined in an application package and metadata associated with the configuration resource may permit a user to change the configuration resource. In some cases, the metadata may restrict the user to change certain portions of the configuration resource, while in other cases, the metadata may permit any type of change to the configuration resource. The updated configuration resource may be stored as a customized resource in the sets of customized resources 206.

An updated resource taken from an application package may be stored with a relationship defined between the updated resource and the original resource within the application package. In some cases, the updated resource may share the same name as the original resource in the application package. In other cases, a Globally Unique Identification (GUID) may be defined for the original resource. The updated resource may reference the original resource's GUID in some fashion such that the two resources are related. In some cases, a GUID may be defined for the updated resource and a table of relationships may be defined to store and track the relationships between the original and customized resources.

The update manager 204 may consolidate the current version of an application package 202 and various sets of customized resources 206. In some embodiments, the update manager 204 may create a customized application package that contains a complete set of resources that may be executed within a virtual environment 212 by an execution engine 210. In other cases, the update manager 204 may transmit the application package 202 along with the sets of customized resources 206 that are applicable to the particular situation.

The current version of an application package 202 may be a constant or 'golden' version of an application. The application package 202 may be a standardized copy or base version from which other customizations may be applied. In an enterprise deployment of an application, a single golden version of an application may be used all across the enterprise, but each department, user, or group may experience a different version. Each user may be able to customize certain portions of the application and have those customizations appear each time the user launches the application.

From the user standpoint, each user may experience a different application however, from the software management standpoint, a single application package may be managed and deployed across many different users.

The execution engine 210 may receive an application package and may cause the application package to execute within a virtual environment. In some instances, the virtual environment 212 may be created and configured by the execution engine 210 specifically for the application.

The virtual environment 212 may be any type of virtual environment in any type of configuration. In many cases, a virtual environment may be a virtual application environment. In other cases, a virtual environment may be a virtual machine environment. In some cases, the virtual environment may be created on the same physical device as the execution engine 210, while in other cases the execution engine 210 may use a virtual environment 212 operable on a different physical device, such as a server, for example.

A user interface 208 may be used to select and launch the application along with the customizations. In a desktop computer scenario, a user may click on an icon to launch an application. The desktop computer may connect to a server device from which the current version of the application package 202 and sets of customized resources 206 may be obtained. Within the desktop computer, an execution engine 210 may configure a virtual environment 212 and cause the application to begin executing. In some embodiments, the application may be presented to the user interface 208 as if the application were executing natively on the desktop computer operating system.

In some such embodiments, a user may have various options to select when launching an application. Such options may enable the update manager 204 to select an appropriate set of customization resources 206 to apply in the specific instance. In some cases, the user may be able to select from a menu or set of options for the appropriate set of customization resources 206 and in other cases, such selection may be done automatically. For example, a laptop computer may execute an application using one set of customization resources when the laptop computer is connected to a local area network that has a server with an update manager 204. The laptop computer may execute the same application using a different set of customization resources when the laptop computer is connected to the same server through the Internet.

A runtime change manager 214 may detect when changes are made to resources in an application package and may categorize, classify, and configure the changes to the sets of customized resources 206 using the policy 216. In some cases, the runtime change manager 214 may operate in the background and may perform its functions without user interference. In other cases, the runtime change manager 214 may interact with a user to determine how a change is to be managed.

The update manager 204 may also handle management of new versions of an application package 218. When a new version of an application package 218 is received, the update manager 204 may create an updated 'golden' application package that would then be set as the current version of the application package 202.

The update manager 204 may update various resources within the current version of the application package 202 based on the metadata associated with the individual resources in the updated package 218. In some cases, the metadata will cause a resource in the new version of the package 218 to overwrite a corresponding resource in the current version of the package 202. In some cases, the metadata will cause a corresponding resource in the sets of customized resources 206 to be deleted as well and, in some cases, replaced with a resource in the new version of the package 218. The metadata may enable or prevent subsequent changes to the new resource by a user.

Figure 3:
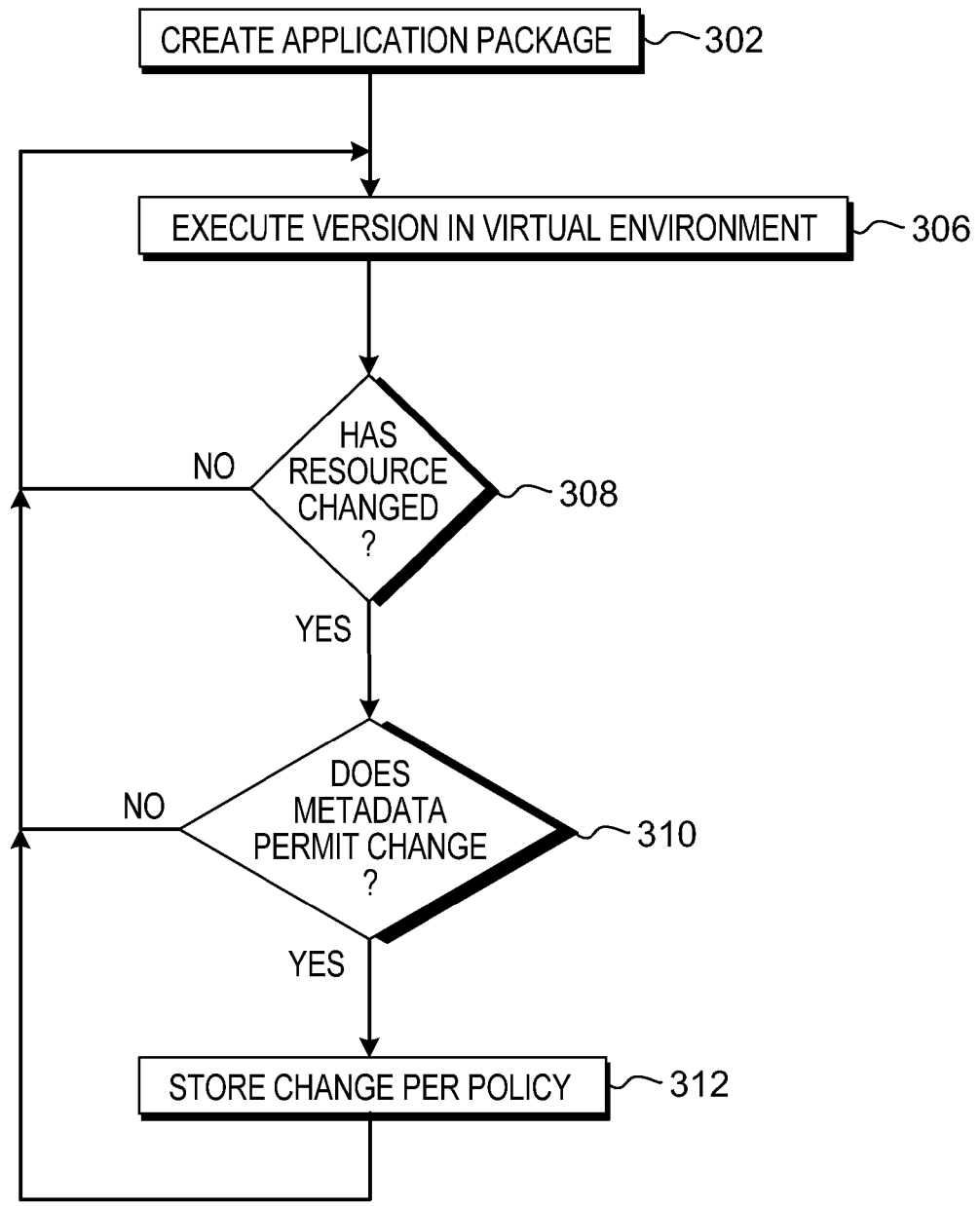
FIG. 3 is a flowchart illustration of an embodiment showing a method for tracking changes.

FIG. 3 is a flowchart illustration of an embodiment 300 showing a method for tracking changes to resources in an application package. Embodiment 300 is an example of various operations that may be performed primarily by a runtime change manager 214, in addition to some operations performed by an update manager 204 and execution engine 210.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 300 illustrates a method for detecting and handling changes to resources made to an application package. The changes may be handled based on metadata associated with the resource as well as a policy.

An application package may be created in block 302 and executed in a virtual environment in block 306.

An application package may be created in block 302 using various mechanisms. In some cases, an application package may be created by an update manager by merging a current application package with sets of customized resources. In some cases, an application package may be executed without additional customized resources.

The application package may be executed in block 306 using any type of virtual environment, such as a virtual machine environment or a virtual application environment.

When a resource change is detected in block 308, and the metadata associated with the resource permits a change in block 310, the change may be stored per a policy in block 312. If the metadata does not permit a change in block 310, the change is not saved and the process returns to block 306.

A runtime change manager 214 may monitor the application execution and may detect any changes made to a resource within the application package. The runtime change manager may be a function that operates inside the same virtual environment as the executing application or may be a function that operates outside the virtual environment. In some cases, the runtime change manager may be a function that is launched by an execution engine along with an application package. Different embodiments may each have different functional architectures.

The metadata used in block 310 may be metadata associated with the individual resources and may be metadata that is part of an application package. In some cases, each resource may have a separate and distinct set of metadata. In other cases, a set of metadata may be applied to groups of resources.

The metadata of block 310 may permit or deny changes to a specific resource or groups of resources. The metadata may define certain resources within an application package that cannot be changed. Such resources may include resources that, if changed, the application may not function properly, such as executable files, dynamic linked libraries, registry settings, COM objects, IP addresses, and other resources.

Some resources within an application package may be modifiable. Such resources may be configuration files that may contain user configurable settings, default templates, or other resources. The metadata of block 310 may be defined by the software manufacturer and may be part of the underlying structure of the application design.

The policy in block 312 may define how changes may be stored and managed within an enterprise environment. The policy may be a locally defined and locally managed set of rules that may be tailored to a company's or enterprise's internal procedures and business models.

The policy may define the different classifications for changes to an application and may define conditions and mechanisms for storing changes. For example, some changes may be identified as local, user specific changes and may be stored on a desktop computer. Other changes may be identified as changes that may be shared across different computers and such changes may be stored on a server device.

In some cases, a policy may deny saving a change in a particular circumstance, even when the metadata may permit the change. For example, a user may create a changed version of a resource but may not have the authorization as defined in the policy to store the change.

Figure 4:
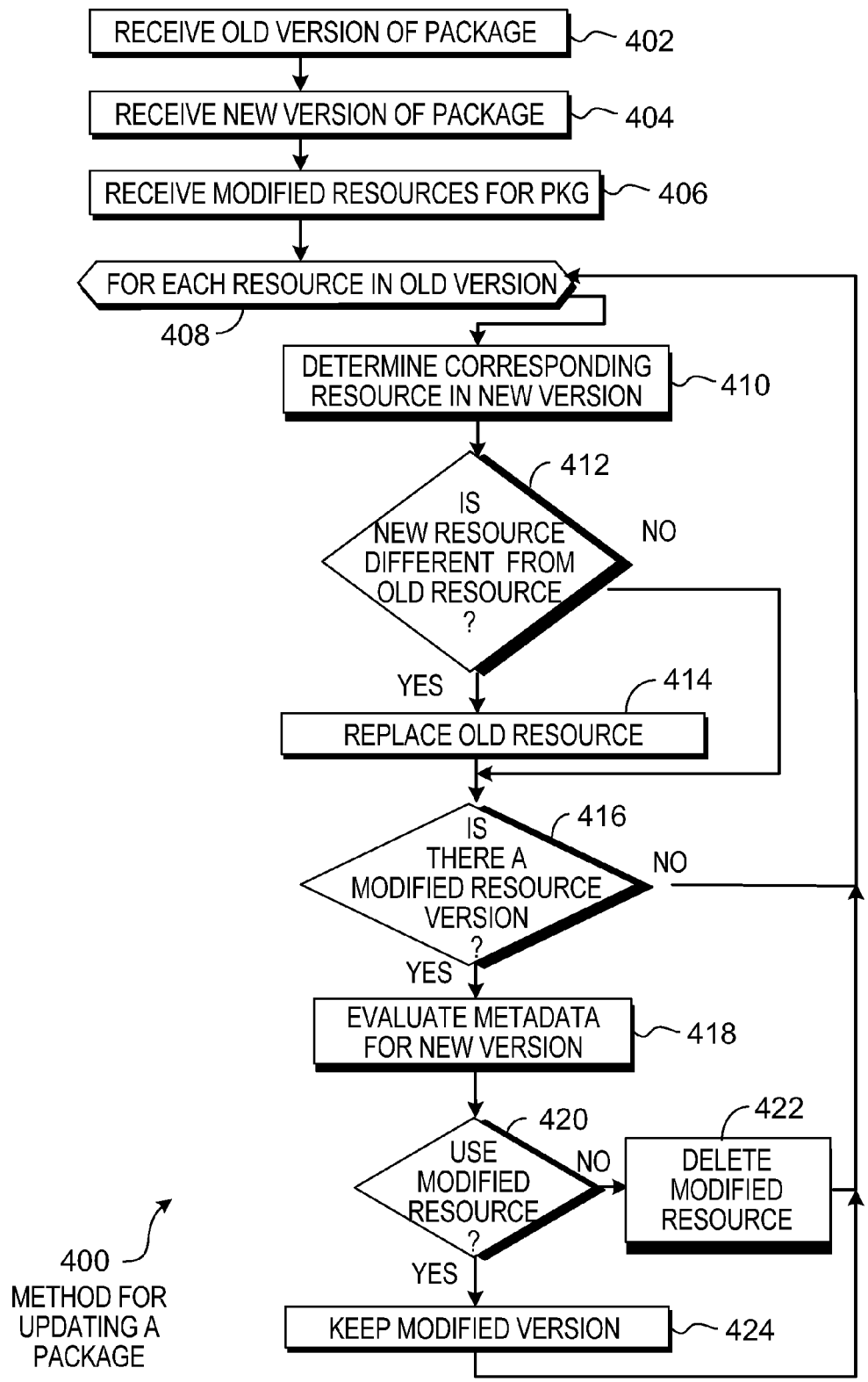
FIG. 4 is a flowchart illustration of an embodiment showing a method for updating an application package.

FIG. 4 is a flowchart illustration of an embodiment 400 showing a method for updating an application package. Embodiment 400 is an example of the various operations that may be performed by an update manager 204 when a new version of an application package 218 is received.

Other embodiments may use different sequencing, additional or fewer steps, and different nomenclature or terminology to accomplish similar functions. In some embodiments, various operations or set of operations may be performed in parallel with other operations, either in a synchronous or asynchronous manner. The steps selected here were chosen to illustrate some principles of operations in a simplified form.

Embodiment 400 is an example of a method for creating a new version of an application package using the metadata associated with the resources of the updated application package. Embodiment 400 performs an analysis on each resource in the old version of an application package. Other embodiments may analyze each resource in a new version of an application package to yield similar results. Embodiment 400 is merely an example of the general process of updating individual resources within an application package and deleting customized resources if those customized resources may interfere with the updates.

Embodiment 400 steps through each resource in an application package and replaces an old version of a resource with a new version, if the new version exists. If a modified version of the old resource exists, the metadata associated with the new resource may indicate that the modified version is not compatible with the updated application package and the modified or customized resource may be removed. If the modified version of the resource is compatible, the modified version may be kept.

An old version of an application package may be received in block 402, as well as a new version of the application package in block 404 and any modified resources for the package in block 406.

The new version of the application package in block 404 may be in the form of a complete application package or may be in the form of changed or updated resources for the application package. In many cases, the updated version of the application package may be created by a software manufacturer and distributed to subscribers of an update service, for example.

For each resource in the old version of the application package in block 408, an analysis of the resource is performed and the resource may be updated and corresponding customized resources may be dispositioned.

A corresponding resource in the new version of the application package may be identified in block 410. Different embodiments may have different mechanisms for determining which resources are related to each other. In some cases, each resource may be assigned a Globally Unique Identifier (GUID) or some other unique name. When a resource in an old version of a package has the same GUID as a resource in a new version, the resources are identical as in block 412. If the GUIDs are different, the resources may be different in block 412 and the old resource may be replaced with the new resource in block 414.

Some embodiments may use a lookup table or some other reference to determine which resources in the new version of an application package may replace resources in old versions of an application package.

In embodiments where a new application package is deployed as a complete set of resources, the operations of block 412 and 414 may be omitted.

If there is no modified version of the current resource in block 416, the process may return to block 408 to process the next resource.

If there is a modified version of the resource in block 416, the metadata associated with the new version of the resource is analyzed in block 418. The metadata associated with the new version of the resource may have a flag or definition that indicates whether old versions of modified resources are compatible with the updated application package.

If the metadata indicates that the modified resource is able to be used in block 420, the modified version may be kept in block 424. If the metadata indicates that the modified resource is not to be used in block 420, the modified versions of the resource may be deleted in block 422.

In some embodiments, a modified version of a resource may be found in several different sets of customized resources. In such embodiments, each instance of a modified resource may be deleted. In some embodiments, the modified resources may be flagged as inactive, moved to a different location, or may be otherwise rendered unusable in lieu of deleting the resource.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A method comprising:
    creating a first version of an application package for an application, said first version of said application package containing a plurality of resources and resource metadata, said plurality of resources used to execute said application within an enterprise, said resource metadata defining for each of said plurality of resources at least how said resource is to be customized;
    processing said first version of said application package to execute said application in a virtual environment context within said enterprise;
    detecting a change to a resource during said executing, said resource being one of said plurality of resources;
    referring to an enterprise policy for said enterprise to classify said detected change to a customized resource;
    evaluating said enterprise policy along with resource metadata associated with said resource to determine a scope for persisting said change, to said resource; and
    storing said change to said first resource in said customized resource in accordance with said scope determination, to use said customized resource in place of said resource when said application is restarted in another virtual environment context within said enterprise.

2. The method of claim 1 further comprising:
    receiving a second version of said application package comprising a second plurality of resources, each of said resources having metadata comprising an overwrite metadata;
    for a second resource in said second plurality of resources in said second version of said application package, said second resource corresponding to said resource:
        evaluating said metadata to determine that said second resource is to overwrite said changed resource; and
        using said second resource in place of said customized resource when said second version of said application package is executed.

3. The method of claim 2 further comprising:
    executing said second version of said application package in a virtual environment;
    detecting a change to said second resource during said executing;
    evaluating said enterprise policy along with said resource metadata associated with said second resource to determine a second scope for persisting said change to said second resource;
    storing said change to said second resource in a second customized resource in accordance with said second scope determination such that said second customized resource is used in place of said second resource when said application package is restarted in a further virtual environment context within said enterprise.

4. The method of claim 2, said second version of said application package comprising a differential set of resources comprising updated resources for a subset of said first application package.

5. The method of claim 2, said second version of said application package comprising a complete set of said resources making up a second version of said application package.

6. The method of claim 2, said corresponding being determined by comparing resource names.

7. The method of claim 2, said corresponding being determined using a lookup table.

8. The method of claim 7, said lookup table comprising Globally Unique Identifiers.

9. The method of claim 1 wherein evaluating said enterprise policy along with said resource metadata associated with said resource to determine the scope for persisting said change comprises:
    detecting that the resource metadata associated with said resource permits making the detected change;
    determining that the enterprise policy denies saving the detected change; and
    wherein storing said change in said customized resource in accordance with said scope determination comprises not storing the said customized resource in response to determining that the enterprise policy denies saving the detecting change, even though the resource metadata permits making the detected change.

10. The method of claim 1, said virtual environment being a virtual machine environment.

11. The method of claim 1, said virtual environment being a virtual application environment.

12. The method of claim 1 further comprising:
    creating a user modified version of said first version of said application package.

13. The method of claim 12, said user modified version comprising a set of user modified resources and said first version of said application package.

14. The method of claim 12, said user modified version comprising a user modified package of said first version of said application package.

15. A system comprising:
an execution engine configured to process a first version of an application package to execute an application in a virtual environment context within an enterprise, said application package comprising containing a plurality of resources and resource metadata for each said plurality of resources used to execute said application within said enterprise, said resource metadata defining for each of said plurality of resources at least how said resource is to be customized; and
a runtime change manager configured to:
detect that a change has occurred with a resource, said resource being one of said plurality of resources in said first version of said application package;
refer to an enterprise policy for said enterprise to classify said detected change to a customized resource;
evaluate said enterprise policy along with resource metadata associated with said resource to determine a scope for persisting said change;
storing said change in said customized resource in accordance with said scope determination, to use said customized resource in place of said resource when said application is restarted in another virtual environment context within said enterprise.

16. The system of claim 15 further comprising:
an update manager configured to:
receive a second version of said application package comprising a second plurality of resources and overwrite metadata for each of said resources; and
for a second resource in said second plurality of resources in said second version of said application package, said second resource corresponding to said resource:
evaluating said overwrite metadata to determine that said second resource is to overwrite said changed resource; and
using said second resource in place of said changed resource when said second version of said application package is executed.

17. The system of claim 16 further comprising:
a lookup table correlating said plurality of resources from said first version with said second plurality of resources from said second version.

18. The system of claim 17, said lookup table comprising Globally Unique Identifiers for each of said plurality of resources.

19. A computer readable storage medium that is distinguished from transmission media comprising computer executable instructions configured to perform a method comprising:
accessing a first version of an application package for an application, said first version of said application package containing a plurality of resources and resource metadata, said plurality of resources used to execute said application within an enterprise, said resource metadata defining, for each of said plurality of resources, at least how said resource is to be customized;
receiving a set of customized resources, at least one of said set of customized resources corresponding to at least one of said plurality of resources in said first version of said application package;
receiving a second version of said application package said second version being newer than said first version, second version containing second resource metadata defining how resources in the second version of the said application package is to be customized;
determining that a first resource within the plurality of resources corresponds to a second resource within said second version of said application package;
determining that said second resource is different than said first resource;
in response to determining that said second resource is different than said first resource, replacing said first resource with said second resource;
identifying a third resource within said set of customized resources that also corresponds to said first resource;
referring to an enterprise policy for said enterprise to classify said third resource;
evaluating said enterprise policy along with said second resource metadata associated with said second resource to determine that said third resource is incompatible with said second version for use within said enterprise; and
making said third resource unavailable for use within said enterprise.

20. The medium of claim 19, said method further comprising:
determining that a fourth resource within said first version of said application package and corresponds to a fifth resource within said second version of said application package;
identifying a sixth resource within said set of customized resources that also corresponds to said fourth resource;
evaluating second metadata associated with said fifth resource along with the enterprise policy to determine that said sixth resource is compatible with said second version for use in said enterprise; and
making said sixth resource available for use within said enterprise when said second version of said application package is executed.

* * * * *